Figure 1:
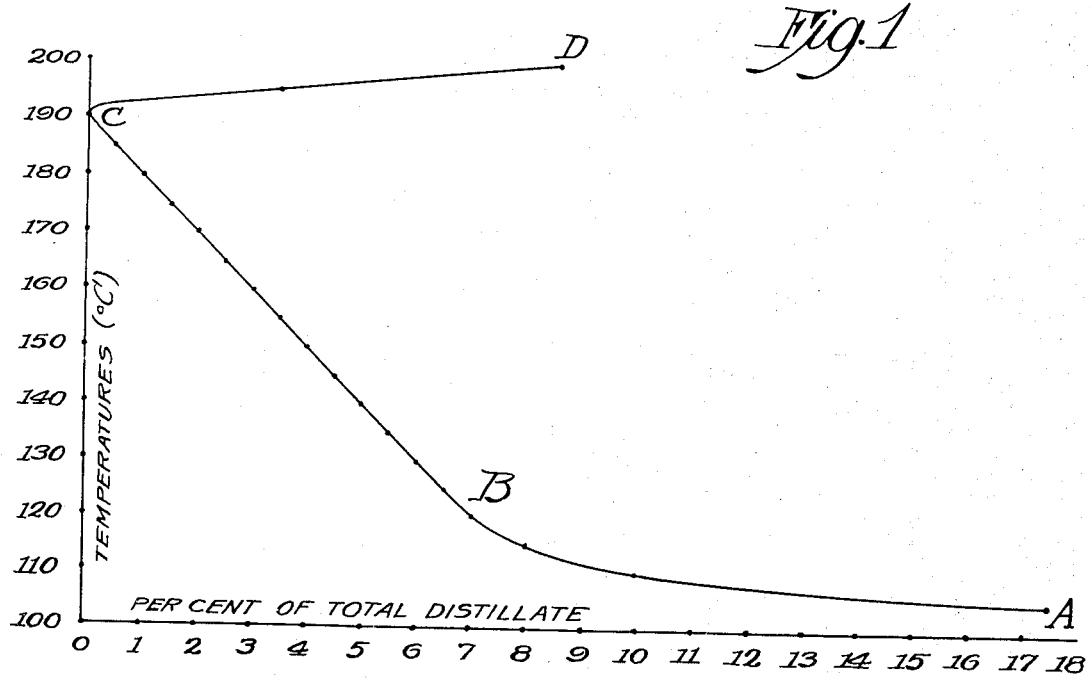

Jan. 30, 1934.

McGARVEY CLINE 1,945,421

OLEO-RESINOUS MATERIAL AND METHOD OF PREPARING SAME

Filed May 23, 1931

Inventor
McGarvey Cline
By Fisher, Clapp, Soans & Bond Attys.

Patented Jan. 30, 1934

1,945,421

UNITED STATES PATENT OFFICE 1,945,421

OLEO-RESINOUS MATERIAL AND METHOD OF PREPARING SAME

McGarvey Cline, Jacksonville, Fla.

Application May 23, 1931. Serial No. 539,585

16 Claims. (Cl. 87—2)

This application represents a continuation in part of my co-pending application, Serial No. 443,616, filed April 11, 1930.

My invention relates to a new and improved form of oleo-resin possessing many advantages over the crude oleo-resins as collected from the living trees.

My invention is considered as having particular application to the oleo-resins derived from certain species of southern yellow pine, but it will be apparent that my invention may be applied to various other naturally occurring oleo-resins.

Pine oleo-resin, commonly called turpentine gum, is obtained by the periodic chipping of pine trees. The oleo-resinous material which exudes from the trees is directed into cups, from which it is collected and hauled to a camp where it is prepared for marketing in the form of gum turpentine and gum rosin. These materials are marketed in competition with steam distilled wood turpentine and wood rosin, which products are produced in large chemical plants, centrally located and equipped with the most modern machinery for the extraction of resinous matter from dead wood and refining the extracted materials into a varied line of chemical products. The manufacturing facilities of the gum naval stores industry, however, are limited to those which can be installed and operated at isolated locations in the forest camps to which the oleo-resins collected from the living timber is delivered. The manufacturing facilities provided at such camps are necessarily crude and temporary in character, as the location of the camps is frequently changed to keep them accessible to the timber being worked. Direct fire is used in all heating operations, and facilities for the manufacture of packages, preparation of glue, removal of dirt from the finished rosins, etc., are all very crude and depend upon the care and skill of individual artisans for the production of quality products. These improvised manufacturing conditions result in dirty rosins and lack of uniformity in their chemical composition due to injurious temperatures resulting from the use of direct fire in the treatment of the crude oleo-resins.

This method of manufacturing in small, isolated, scattered plants not only results in the maximum variation in the quality of the products produced, but is necessarily associated with high costs of marketing and distributing these products.

It has long been recognized by progressive elements in the gum naval stores industry that the industry would profit by centralizing its manufacturing operations in well equipped permanent plants operated throughout the year, and by employing more economical methods of storing and marketing its products. Repeated efforts have been made to establish such operations. The insurmountable obstacle to the economic success of such attempts, however, has been the chemical and physical characteristics of the crude oleo-resins obtained from the living trees.

Crude oleo-resin, as collected from the forest, is a viscous, semi-crystalline mass contaminated with sand, particles of bark, wood chips, and other kinds of foreign matter. The crystalline matter makes the oleo-resin opaque, and, upon standing in containers, the crystals settle to the bottom into a semi-solid mass which completely envelops and conceals most of the contaminating materials. The crude oleo-resins also contain varying amounts of water and materials soluble in water. They are acid in their action upon metal containers and when handled or stored in ordinary iron containers become highly discolored. On this account crude oleo-resins must be handled and stored in containers made of wood, aluminum, copper or other material which will not produce undesirable discoloration.

The general composition of crude oleo-resins is susceptible to wide variation and due to its semi-crystalline form its composition can not be readily determined. It has, therefore, never become an article of commerce and it has been necessary for the producer of it to convert it into rosin and turpentine before he could market it. Crude oleo-resins are also exceedingly unstable in their chemical composition. From the time they exude from the tree they are continually undergoing chemical change. These changes are relatively rapid while the oleo-resins are exposed in thin films on the surface of the tree during the time required for them to flow from the point at which they exude from the tree to the cup or receptacle placed for collecting them. These changes in composition are less rapid after the oleo-resins are collected into a mass but still progress at a rate which materially affects the value of the products produced from them if they are retained in their crude form for extended periods of time before they are manufactured into rosin and turpentine. This deterioration of the crude oleo-resins has necessitated their prompt conversion into the ultimate products derived from them. These facts, together with the impracticability of handling and storing the crystalline oleo-resin in iron tanks and pipe lines with developed forms of pumps, have prevented the gum naval stores industry from taking advantage of the economies resulting from centralized manufacturing and distribution. It seems evident, therefore, that progress along these lines in the industry must be based upon some method of converting the crude oleo-resins into a form in which they can be graded, economically transported and handled at central manufacturing plants, and into a form which can be stored without deterioration.

After considerable experimentation I have solved the above problems by converting the crude oleo-resins from a crystalline, opaque, corrosive form in which they are collected from the forest, into a substantially stable transparent liquid form, in which new form they may be easily graded by color, viscosity, and similar simple tests. In this new form the oleo-resin is substantially non-acid in its action upon metals and may be stored and transported in iron containers without discoloration. The chemical composition of this neutral liquid oleo-resin also shows remarkable stability thus permitting long periods of storage prior to its conversion into the commodities produced from it, without noticeable effect upon the proportion or quality of the products derived.

It is accordingly an object of my invention to provide a natural oleo-resin having the above-mentioned characteristics.

A further object is to provide a new and improved method of converting the crude crystalline, corrosive, chemically unstable, natural oleo-resins into this new form, said method being simple and practical for field operation under existing conditions.

A further object of my invention is, through the above-mentioned objectives, to provide an economical means for centralizing the manufacturing operations of the gum naval stores industry in modernly equipped plants, permanently located and operated throughout the year, and through such centralized production improve the quality of gum naval stores products and decrease the cost of distribution which present decentralized methods of manufacture entail.

Various other objects and advantages will become apparent to those skilled in the art as the description proceeds.

Referring to the drawing forming a part of this specification:—

Figure 2:
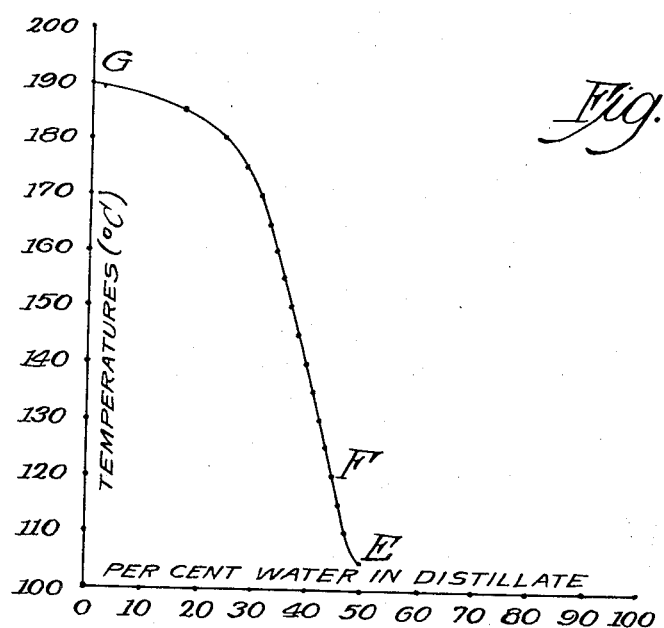

Fig. 1 is a curve showing the rate of distillation in per cent of total distillate, in accordance with my improved process, and Fig. 2 is a curve indicating the percentage of aqueous matter in the distillate at various points in the process.

I have made the somewhat astonishing discovery that, by means of a simple heating process, crude oleo-resins can be changed from an undesirable opaque, acid, crystalline form chemically unstable in its composition to a transparent, neutral, liquid form which remains a homogeneous substance and during long storage shows no indications of the chemical instability which is characteristic of crude natural oleo-resins. This process is substantially as follows—

The crude oleo-resin described above, as obtained from the forest, is placed in a suitable container and heated to a temperature sufficiently high to reduce the semi-crystalline mass to a liquid state. The temperature required for complete liquefaction will vary somewhat with the composition of the oleo-resin, but, in general, a temperature of approximately 100 degrees centigrade at atmospheric pressure is sufficient. Extraneous trash is removed during the melting operation by causing the oleo-resin to pass through suitable straining devices as it is melted, or by straining it after it is melted. The first method is preferable.

While it is desirable to remove bark and other trash as early in the heating process as possible, this operation can be done at the conclusion of the heat treatment with only slight effect upon the quality of the product resulting from the heat treatment, described below.

The oleo-resin is preferably conducted to a suitable container or still, which is preferably connected to a reflux condenser, the condensate from which passes through a suitable gravity separator before it returns to the still. In passing through the gravity separator the aqueous matter contained in the condensate together with acids and other materials soluble in water are separated from the terpine constituents of the condensate. The aqueous matter thus separated is not allowed to return to the still but the remainder of the condensate is returned to the oleo-resin being treated.

The heating process is controlled by gradually increasing the temperature of the oleo-resin in the still and observing the composition of the distillate as it flows from the condenser. To insure a complete transformation of the oleo-resin the temperature must be increased until the condensate contains no aqueous matter. Figure 1 is a typical temperature-distillate curve showing the general progress of the heating process when conducted at atmospheric pressure. The curve ABCD shows the relative rate of flow of the condensate as the temperature of the oleo-resin is increased. The curve EG shows the proportion of aqueous matter contained in the condensate as the temperature of the oleo-resin is increased. It will be seen that both of these functions approach a minimum as the operation progresses toward the critical temperature C at which the transformation of the oleo-resin is completed. In the particular oleo-resin to which these curves apply, the critical temperature was reached at 190 degrees C. It is generally characteristic that when the critical temperature is reached, all aqueous matter not only disappears from the condensate but the flow of all condensate practically ceases. A further increase of temperature beyond this point results in a rapid rise in the rate of flow of the condensate but after the critical temperature has been passed the condensate contains no aqueous matter. I, therefore, define the critical temperature at which the conversion of the oleo-resin is completed as that temperature at which substantially all aqueous matter disappears from the distillate. It has been found that this temperature varies somewhat with the composition of the oleo-resin. Generally speaking, it is higher in oleo-resins rich in crystalline materials than it is in those in which the crystalline structure is less pronounced. My investigations thus far indicate that, when the treatment is conducted at atmospheric pressure, the critical temperature ranges between 160 and 190 degrees C. By reducing the pressure the entire temperature scale may be lowered; or by increasing the pressure the temperature scale may be raised. Irrespective of pressure, however, the critical temperature is that at which aqueous matter disappears from the distillate.

It will be understood that my process is completed at the point C. The curve CD is shown merely to illustrate what would happen if the heating were continued beyond the point C. In commercial practice, the heating would probably be carried slightly above the critical point C in order to make certain that the conversion was complete.

While the points C and G shown in Figs. 1 and 2 respectively are located at zero percent, it is to be understood that the curves are illustrative merely, and that in actual practice the points C and G may possibly be slightly removed from the ordinates or at points above zero percent.

As a result of the above described process, I convert the oleo-resins into a new form which has the following general characteristics:—

1. They are stable, homogeneous, liquids in which all of the constituents are soluble in each other in all proportions. At ordinary atmospheric temperatures they have a consistency of a thick molasses; their viscosity decreases rapidly as their temperature is increased and at approximately 80 degrees C. they are thin liquids which can be readily handled with pumps and other means for moving liquids.

2. They are not corrosive to ordinary iron containers and are not discolored from contact with iron.

3. They are transparent and have characteristic colors ranging from light ambers to deep mahogany reds. These colors are characteristic of the various resin acids which are contained in natural oleo-resins used commercially as different grades of gum rosins. This new form of oleo-resin, therefore, can be graded by the same color scale now employed for the grading of commercial rosins. Being stable, homogeneous liquids, their viscosity at any selected temperature varies definitely with the essential oil content of the oleo-resin. Thus, color and viscosity afford a simple and accurate way of commercially grading these materials.

4. The chemical stability of this new form of oleo-resin ideally adapts it for long time storage in bulk form. The natural oleo-resins which have not been processed are non-homogeneous mixtures of materials which are not in a state of chemical equilibrium; accordingly, they are adversely affected by long storage.

5. The new form of oleo-resin may be readily mixed, at ordinary atmospheric temperatures, with water and aqueous solutions of alkalis. The chemical reactions between the alkali and the resin acids, occurring with great rapidity, converts the resin acids into soap. These resin soaps may then be separated from the volatile constituents of the oleo-resin by the simple process of boiling the mixture and passing the vapors through a suitable condenser and passing the condensate through a gravity separator. When it is considered that approximatelyy 60% of the total commercial consumption of rosin involves the conversion of the rosin into soaps, it is evident that this property of the new form of oleo-rosin affords apportunities for large economies in the manufacture and distribution of products derived from it.

While I am not in a position at this time to state conclusively the theory of the change which occurs in natural oleo-resins as a result of my heating treatment, it is evident that the operation is associated with an important molecular rearrangement of some of the major constituents of the oleo-resin. Such a change is indicated by the complete disappearance of crystalline matter in the new product and by the complete change of the solubility characteristics of its component materials. The greater chemical stability of the new product may be due to a number of causes, e. g., the removal of certain organic acids soluble in water which, while present, may act as catalytic agents; the removal of water and air, and the molecular rearrangement itself may produce the greater stability of the new product. Resin components are present in said product in amorphous condition. Until the science of chemistry has progressed much further in its study of the complex organic compounds of which natural oleo-resins are composed, the basic reasons for the changes which have been discussed can only be a matter of surmise. The indications are, that that part of the heating operation represented by the curves AB and EF does not produce any molecular change in the resinous material. A progressive change in the molecular arrangement occurs during that part of the heating process represented by the curves BC and FG, it is believed.

Various changes and modifications within the spirit of my invention will become apparent to those skilled in the art from the description herein given. Hence, I do not wish to be limited to the specific embodiment shown or uses mentioned except as set forth in the appended claims, which are to be interpreted as broadly as the state of the art will permit.

I claim as my invention:

1. As a new composition of matter, an oleoresinous product obtained by subjecting a natural oleo-resin as obtained from living trees to a heat treatment sufficiently high to distill off the water and water soluble acid constituents but not substantially higher, said product being a substantially transparent viscous liquid substantially free from water and water-soluble acids, but containing substantially all of the oily and resinous constituents of the native material and being substantially stable over long periods of time.

2. A method of treating a natural oleo-resin as obtained from living trees, comprising heating said oleo-resin to distill off the free water and water-soluble acid constituents thereof, separating the distillate into its aqueous and oily components, and returning said oily component to the material being subjected to heat treatment, thus producing a product which upon cooling is a clear, transparent, viscous, non-crystallizing liquid.

3. A method of treating a natural oleo-resin as obtained from living trees, comprising removing extraneous solid impurities therefrom, distilling off the free water and water-soluble acid constituents thereof, separating the distillate into its aqueous and oily components, and returning said oily component to the material undergoing distillation, thus producing a product which upon cooling is a clear, transparent, viscous, non-crystallizing liquid.

4. A method of treating a natural oleo-resin as obtained from living trees, comprising heating the same under such conditions that no substantial destructive distillation occurs, continuing said heating until a distillate obtained thereby is substantially free from an aqueous component, and returning to the material being subjected to heat treatment the oily component of said distillate, thus producing a product which upon cooling is a clear, transparent, viscous, non-crystallizing liquid.

5. A method of treating a natural oleo-resin as obtained from living trees, comprising removing extraneous solid impurities therefrom, heating the same under such conditions that no substantial destructive distillation occurs, continuing the heating until the distillate obtained thereby is substantially free from an aqueous component, and returning to the material being subjected to heat treatment the oily component of said distillate, thus producing a product which upon cooling is a clear, transparent, viscous, non-crystallizing liquid.

6. A method of treating a natural oleo-resin as obtained from living trees, comprising raising the temperature thereof to a temperature which corresponds to the range 160 to 190 degrees C. at atmospheric pressure is obtained, separating the distillate into its oily and aqueous components, and returning to the original batch said oily component.

7. A method of treating a natural oleo-resin as obtained from living trees, comprising removing insoluble impurities therefrom, raising the temperature thereof to a temperature which corresponds to the range 160 to 190 degrees C. at atmospheric pressure, separating the distillate into its oily and aqueous components, and returning to the original batch said oily component.

8. In the treatment of pine oleo-resins in preparation for shipment or storage, the steps comprising heating pine oleo-resins as obtained from living trees and distilling free water and water-soluble acids therefrom, continuing the distillation until free water has been removed and until the vapors condensing out including oily constituents contain substantially no water-soluble acid matter, separating oily constituents from the distillate and returning said oily constituents to the material undergoing treatment, the said steps resulting in said material having substantially no crystallized resin acids present therein and being a flowable liquid at temperatures encountered in the transportation or storage thereof and which is clear and transparent when substantially no water is present.

9. A pine tree product substantially free from water and water soluble organic acids and stable over long periods of time, prepared by the heat treatment of pine tree exudates at a temperature which corresponds to a temperature in the range of 160° to 190° C. at atmospheric pressure, which product comprises a modified oleo-resin product obtained from pine tree exudates without addition of solvent material thereto and without substantial removal of oily material from said exudates, substantially the whole of the oleo-resin product being a clear, transparent, viscous liquid in which resin components are present in amorphous condition.

10. A pine tree product prepared by the heat treatment of pine tree exudates, which product comprises a modified pine oleo-resin product obtained from pine tree exudates without addition of solvent material thereto and without substantial removal of oily material from said exudates, the said product containing substantially none of the free water of said exudates, the said product being substantially free from crystallized resin acids, and the said product being a flowable, transparent, viscous liquid at temperatures at which crystallized resin acids ordinarily exist in untreated exudates as solid material.

11. A pine tree product prepared by the heat treatment of pine tree exudates, which product comprises a modified pine oleo-resin product obtained from pine tree exudates without addition of solvent material thereto and without substantial removal of oily material from said exudates, the said product containing substantially none of the free water of said exudates, and the said product being substantially free from crystallized resin acids and substantially free from organic acids which are corrosive to iron and other metals and substantially the whole of the oleo-resin product being a clear, transparent, viscous liquid when substantially no water is present.

12. A pine tree product prepared by the heat treatment of pine tree exudates, which product comprises a modified pine oleo-resin product obtained from pine tree exudates without addition of solvent material thereto and without substantial removal of oily material from said exudates, the said product containing substantially none of the free water of said exudates, the said product being substantially free from crystallized resin acids and substantially free from organic acids which are corrosive to iron and other metals, and the said product being a flowable liquid at temperatures at which crystallized resin acids ordinarily exist in untreated exudates as solid material and substantially the whole of the oleo-resin product being a clear, transparent, viscous liquid when substantially no water is present.

13. A pine tree product comprising a heat modified oleo-resin containing substantially the full amount of oily material of the crude oleo-resin, and which product is so free from acid content as compared to the crude oleo-resin as to have reduced corrosive power and is a flowable liquid at normal temperatures of transportation and storage.

14. A pine tree product comprising a heat modified oleo-resin containing substantially the full amount of oily material of the crude oleo-resin, and which product is substantially free from crystalline resin acids and is a flowable liquid at normal temperatures of transportation and storage.

15. A method of treating oleo-resin as found in nature, comprising heat treating such oleo-resin at temperatures up to that corresponding to approximately 190° C. at atmospheric pressure until water and water soluble acids are driven off and continuing such heat treatment until the material treated is substantially free from corrosive organic acids, and the resultant product is flowable at normal temperatures of transportation and storage, the heat treatment being conducted under conditions precluding substantial removal of oily material from the oleo-resin.

16. A method of treating oleo-resin as found in nature, comprising heat treating such oleo-resin at temperatures within the range, corresponding to 160° C. to 190° C. at atmospheric pressure, until the resin acids are modified and the material being subjected to heat treatment is substantially free from crystalline resin acids and is flowable at normal temperatures of transportation and storage, the heat treatment being conducted under conditions precluding substantial removal of oily material from the oleo-resin.

McGARVEY CLINE.